July 16, 1963 E. J. GOLEC 3,097,813
SPINNING TYPE FISHING REEL
Filed Aug. 16, 1962 3 Sheets-Sheet 1
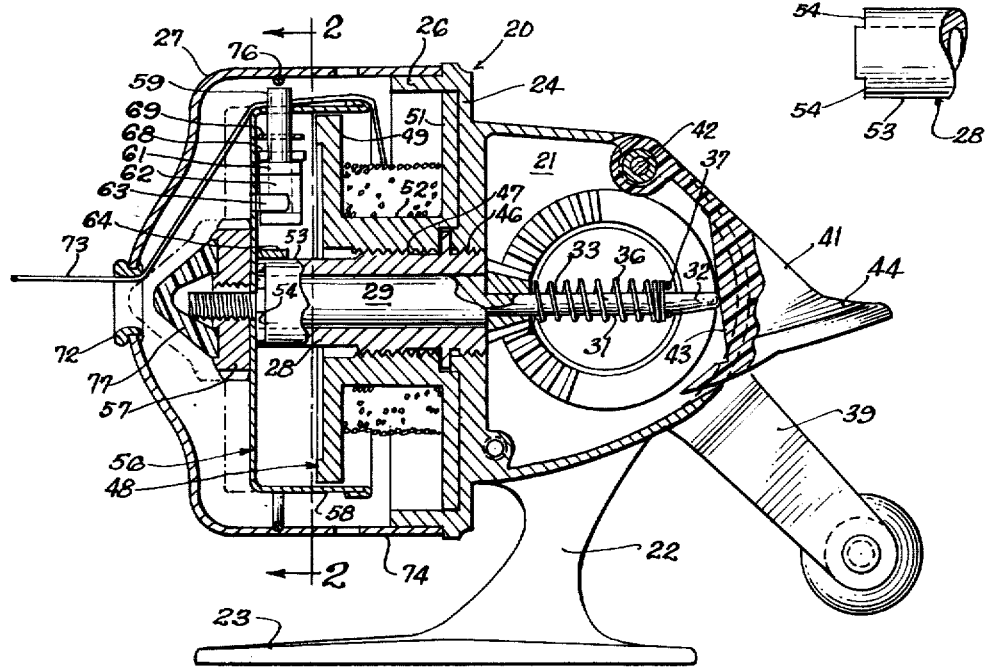
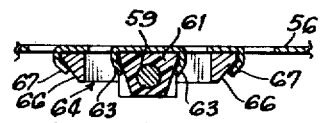
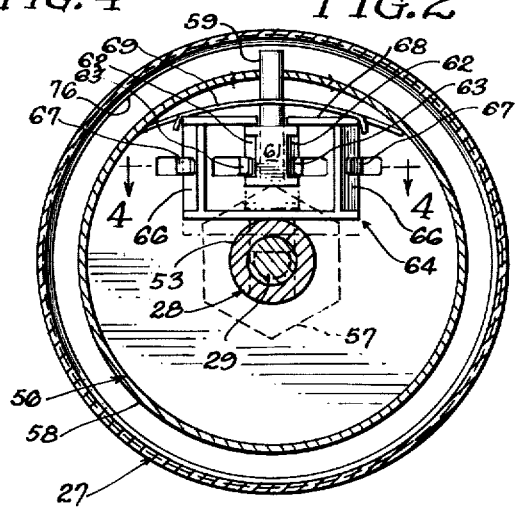
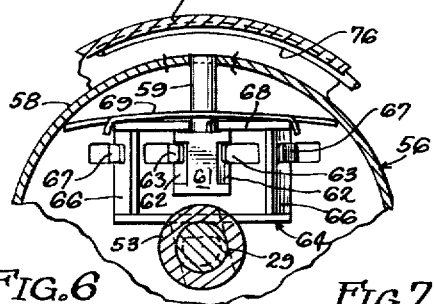
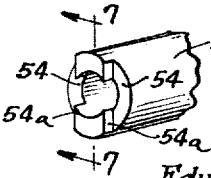
INVENTOR.
Edward J. Golec
BY Nathan H. Krans
Frank H. Marks
Att'ys

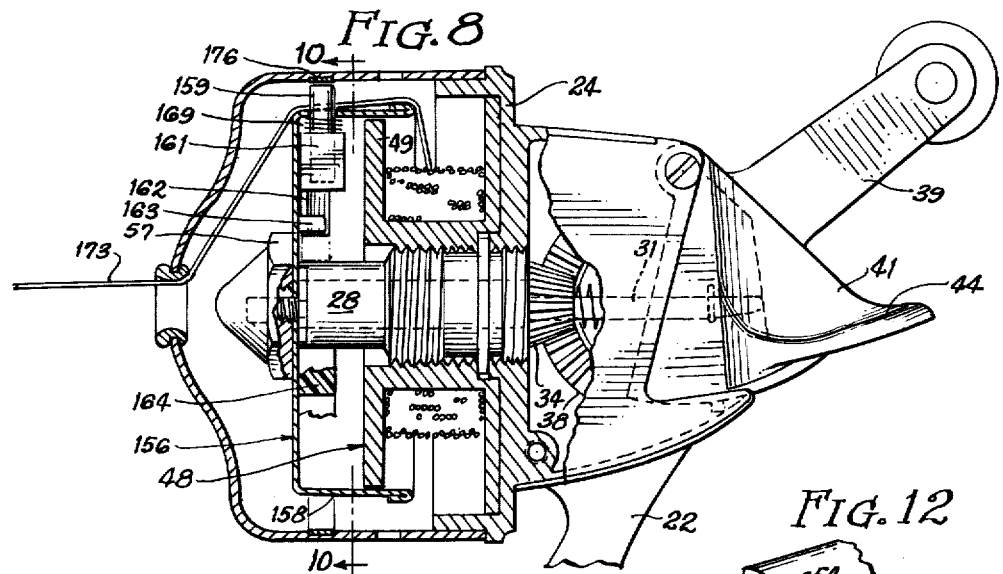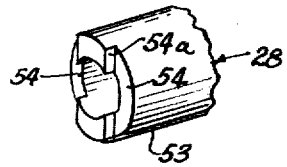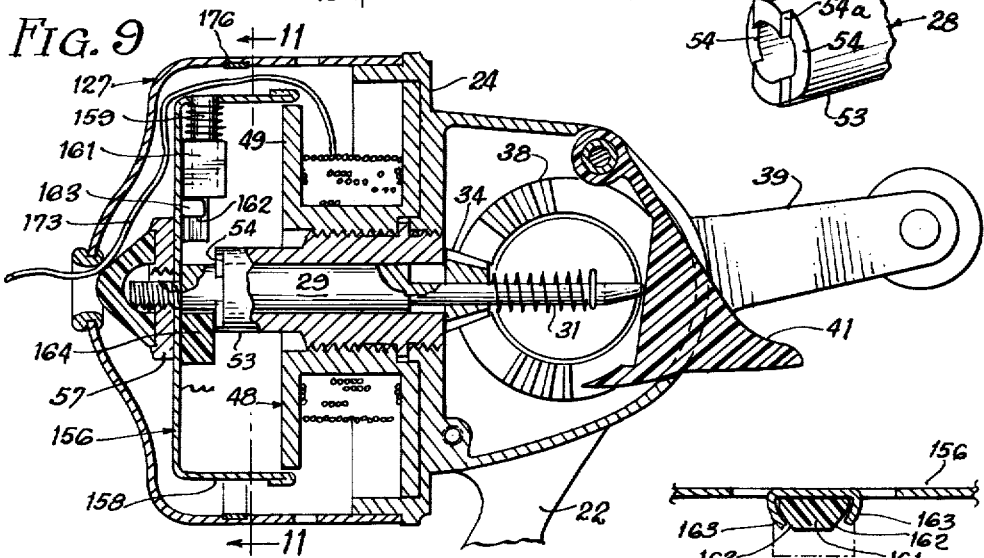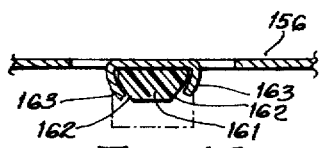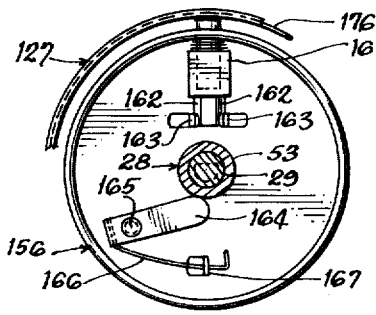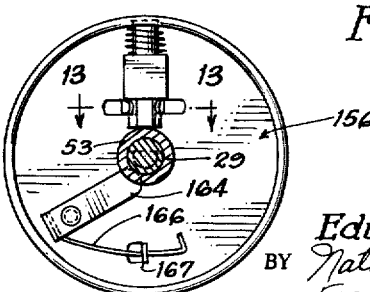

July 16, 1963 E. J. GOLEC 3,097,813
SPINNING TYPE FISHING REEL
Filed Aug. 16, 1962 3 Sheets-Sheet 3

INVENTOR.
Edward J. Golec
BY Nathan H. Kraus
Frank H. Morles
Att'ys

United States Patent Office 3,097,813
Patented July 16, 1963

3,097,813
SPINNING TYPE FISHING REEL
Edward J. Golec, Chicago, Ill., assignor to Sears, Roebuck and Co., Chicago, Ill., a corporation of New York
Filed Aug. 16, 1962, Ser. No. 217,446
12 Claims. (Cl. 242—84.2)

My invention relates to improvements in fishing reels of the spinning type.

In reels of this type, the spool on which the line is wound remains stationary and, in casting, the line feeds off the spool about the periphery of a spool flange. The line is retrieved by a rotatable finger or pick-up which guides the line back on the spool.

The present invention is directed to improvements in the pick-up means and embodies novel magnetic means for actuating the pick-up means by reason of which the pick-up means is made more simple in construction and efficient in operation than prior art devices of like character.

Another object of my invention is the provision of magnetic means for actuating the pick-up means so that it may function as a brake to arrest feed-off of the line from the spool.

Other and further objects and advantages of my invention will become apparent from the following description when the same is considered in connection with the accompanying drawings in which, FIG. 1 is a cross-sectional view of a spinning type fishing reel illustrating a preferred embodiment of my invention;

FIG. 2 is a cross-sectional view taken substantially on line 2—2 of FIG. 1;

FIG. 3 is a fragmentary view similar to FIG. 2 but showing the parts in a different related position;

FIG. 4 is a cross-sectional view taken substantially on line 4—4 of FIG. 2;

FIG. 5 is a fragmentary side elevational view of the main bearing bushing;

FIG. 6 is a front perspective view of the same;

FIG. 7 is a cross-sectional view taken substantially on line 7—7 of FIG. 6;

FIG. 8 is a vertical cross-sectional view of a modified embodiment of my invention;

FIG. 9 is a similar view showing the parts in a different operative relationship;

FIG. 10 is a cross-sectional view, on a reduced scale, taken substantially on line 10—10 of FIG. 8;

FIG. 11 is a cross-sectional view, on a reduced scale, taken substantially on line 11—11 of FIG. 9;

FIG. 12 is a fragmentary front perspective view of a structural detail;

FIG. 13 is a cross-sectional view, on an enlarged scale, taken substantially on line 13—13 of FIG. 11;

Figure 14:
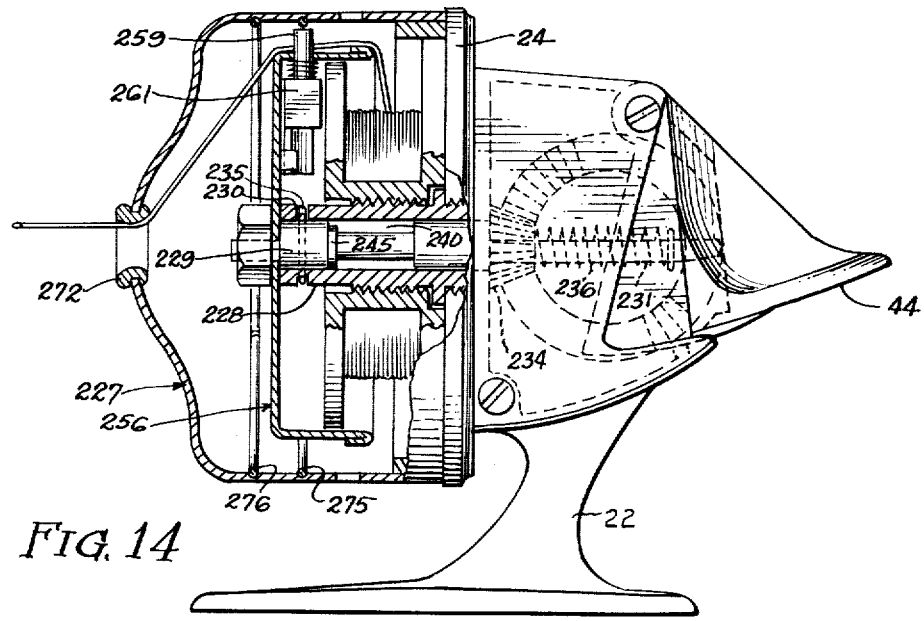
FIG. 14 is a side elevational view, partly in cross-section, of another modified embodiment of my invention.
Figure 15:
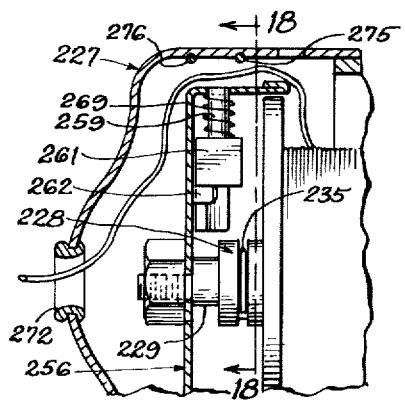
FIG. 15 is a fragmentary view similar to FIG. 14 but showing the parts in a different operative relationship.
Figure 16:
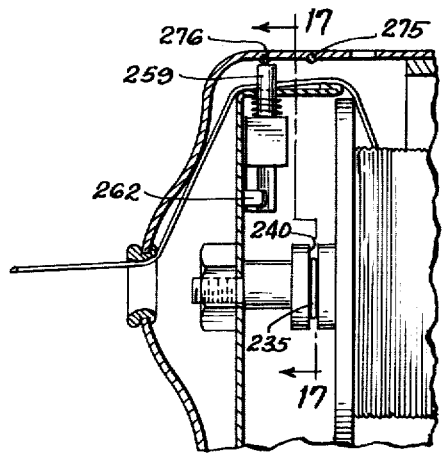
FIG. 16 is a view similar to FIG. 15 but showing the parts in a different operative relationship.
Figure 17:
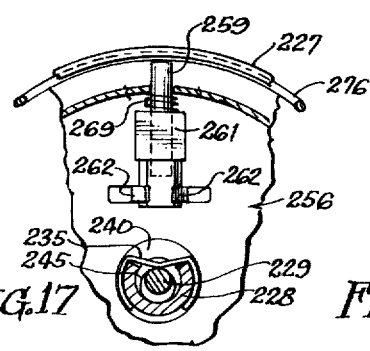
FIG. 17 is a cross-sectional view taken substantially on line 17—17 of FIG. 16.
Figure 18:
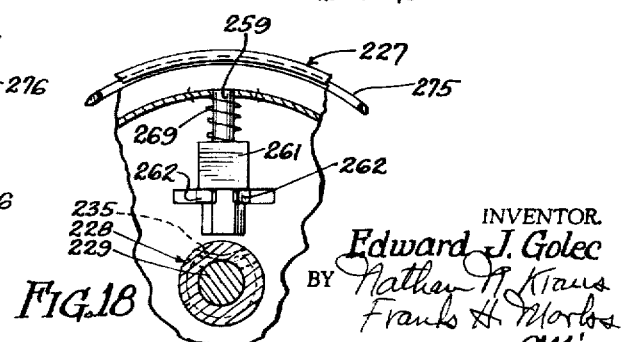
FIG. 18 is a cross-sectional view taken substantially on line 18—18 of FIG. 15.

Referring specifically to FIGS. 1 through 7, illustrating a preferred embodiment of my invention, the numeral 20 indicates a housing or casing having an integral side wall 21 and a removable side plate, not shown. A seat post 22 integral with the casing depends therefrom and terminates in the usual elongated tank 23 by which the reel may be attached to a conventional fishing rod. The casing 21 includes an integral circular forward wall 24 having a forwardly extending annular flange 26, the periphery of which is provided with bayonet type slots, not shown, cooperating with complementary bosses provided on the inner surface of a cup-shaped hood 27, hereinafter to be described. The wall 24 supports a bearing bushing 28 centrally thereof in which is journalled a spindle 29 constituting a part of the line winding assembly. The spindle includes a rearward extension 31 of reduced diameter having a bullet nosed terminal portion 32. The extension 31 is provided with a longitudinally extending flat surface 33 and carries a bevelled pinion 34 formed with an opening having a flat side conformably and non-rotatably receiving the similarly shaped spindle extension. Thus, the spindle 29 is rotatable with the pinion 34 but the spindle is slideable axially relative thereto. A compression spring 36 is carried on the spindle extension 31 and is interposed between the pinion 34 and a C-washer 37 carried on the spindle extension. As will be apparent, the spring 36 normally biases the spindle 29 to the right, as viewed in FIG. 1. The pinion 34 is driven by a bevelled gear 38 which is carried on a shaft journalled in the casing wall 21, the shaft being driven by a crank handle 39.

An actuating member 41, shaped substantially as illustrated, is pivotally connected at its upper end to the casing 20, as at 42, and affords a closure for the rearward opening of the casing. A portion 43 of the actuating member 41 extends into the cavity of the casing 20 and engages the terminal portion 32 of the spindle extension 31. The actuating member 41 includes a thumb engaging portion 44 disposed in a position so that it may be conveniently engaged by the thumb of a fisherman when holding the rod.

The bushing bearing 28 includes a threaded end 46 engageable in a corresponding threaded opening in the circular wall 24 of the casing and a threaded intermediate portion 47 on which is carried a spool 48 comprising front and rear flanges 49 and 51 respectively, and an integral barrel portion 52, the barrel portion being correspondingly threaded to cooperate with the threads on the bushing bearing 28. The forward end portion 53 of the bushing bearing 28 is of reduced diameter and the end face is machined at diametrically opposed points to provide opposed recess areas 54, as illustrated in FIG. 6, for a purpose as will be hereinafter explained.

The forward end of the spindle 29 carries a cupped spooling member 56 which is secured on the threaded end of the spindle, as by a nut 57. The spooling member 56 is slightly larger in diameter than the spool 48 itself and includes a smoothly rounded flange 58 which in normal position, as illustrated by the solid lines in FIG. 1, encompasses and projects over the flange 49 of the spool. The spooling member 56 carries a pick-up pin 59 formed of a permanent magnetic material having a high degree of magnetism, such as "Alnico," the lower end of the pin being encased in a block of material 61, preferably of nylon, so that it may have self-lubricating qualities. The block 61 is provided with a recess 62 at each side thereof and lugs 63 are struck from the spooling member 56 and bent inwardly to loosely engage in said recesses to permit free radial movement of the block 61 within the limits of the lengths of the recesses 62. In its retracted position the free end of the pin 59 is flush with the peripheral surface of the spooling member 56, as illustrated by the solid lines in FIG. 3.

A yoke member 64 formed as a generally rectangular frame and of non-magnetic material is provided with opposed angularly sloping sides 66 which are loosely engaged by lugs 67 struck out from the spooling member 56, as illustrated. The upper side 68 of the yoke member 64 is split substantially medially thereof to provide a space for the passage of the pick-up pin 59. A flat spring 69 extends across the top of the yoke member 64 and bears against the same, the spring being provided with a central aperture to accommodate the pick-up pin 59 and having, at each end, portions adapted to engage the inner face of the flange 58 of the spooling member. It will be seen by reference to the drawings, that the spring 69 normally biases the yoke member 64 in a direction away from the flange 58 and the inner ends of the split upper side 68 engage the block 61 to urge the pin 59 to retracted position, as illustrated by the solid lines in FIG. 3. It will be apparent that the yoke member 64 may move radially relative to the block 61 and that the inward movement of the yoke member 64 is limited by the engagement of the inner ends of upper side 68 against the block 61 which is itself prevented from moving further inwardly by engagement of the lugs 63 with the shoulders provided at the outer ends of the recesses 62.

Referring to FIG. 3 it will be seen that when the yoke member 64 is in the position illustrated, which corresponds to normal non-operative position, the pick-up pin 59 is in retracted position, since it is prevented from moving outwardly by the position of the yoke member. When the yoke member is caused to move to the position illustrated in FIG. 2, as will be hereinafter explained, clearance is afforded for radial movement of the pick-up pin 59, since the pin then may be caused to move from the solid line position of FIG. 3 to the position illustrated in FIG. 2.

A cup-shaped hood 27 is provided at its center with an open grommet 72 through which a line 73 is adapted to pass and the flange 74 of the hood is provided with internal embossings for engagement with the bayonet slots of the flange 26. The hood 27 is formed of a suitable non-magnetic material, preferably aluminum, and is provided with an internal annular groove in which is received and suitably fixed therein a ring of iron 76 or other suitable paramagnetic material. The ring 76 is disposed in a plane substantially coincident with the plane of revolution of the pick-up pin 59 in line retrieving position. The radial distance between the outer end of the pick-up pin 59, when the same is in the position illustrated in FIG. 1, and the ring 76 is such that the pick-up pin which is radially moveable will be attracted to the ring and retained in extended position by magnetic attraction. It will be understood that the pick-up pin 59 is limited in its outward movement so that it falls just short of contacting the ring 76, thereby affording a slight clearance to avoid contact between the end of the pick-up pin and the ring 76, thus assuring smooth and quiet operation.

The nut 57 carries a snubbing element 77 which may be molded from nylon or any other suitable material and which includes a smoothly rounded annular forward surface adapted to engage against the marginal edges surrounding the grommet 72. Nut 57 includes a series of circumferentially spaced radial embossings affording means for facilitating assembly of the nut on the spindle 29.

The above described reel operates in the following manner. Assuming that a line retrieving operation has just been completed, the parts are in the relationship illustrated in FIGS. 1 and 2 in which the bottom side of the yoke member 64 is in engagement with the periphery of the forward end portion 53 of the bushing bearing 28. In effect, the yoke member has been cammed radially outwardly to the position seen clearly in FIG. 2, thereby affording clearance for the movement of the block 61 radially outwardly and with it the pick-up pin 59. In this position the pin 59 is in vertical alignment with the paramagnetic ring 76 and the magnetic attraction between the pin and the ring maintains the pick-up pin in the outwardly extended position so as to engage the line 73 for reeling in the same.

To prepare the reel for casting, the operator presses his thumb down on the thumb portion 44, rocking the actuating member 41 in a clockwise direction, as viewed in FIG. 1. This action shifts the spindle 29 together with the spooling member 56 to the left, as in FIG. 1, so that the yoke member 64 is urged by the spring 69 into engagement with the periphery of the spindle 29, substantially as illustrated in FIG. 3. It will be noted that in this position, the top side 68 of the yoke member 64 engages the block 61 and retains the pick-up pin 59 in retracted position. The yoke member 64 itself is retained in retracted position by engagement of the end face of the bushing bearing 28 against the side edge of the bottom of the yoke member, the pressure of spring 36 being adequate to prevent inadvertent displacement of the yoke member. It will also be understood that in the position just described, the pick-up pin is out of vertical registration with the ring 76 and separated a sufficient distance to eliminate any magnetic attraction between the pick-up pin and ring. With the pick-up pin so retracted, there is nothing to interfere with the play out of the line and the operator may now cast in the usual manner. For a portion of the casting operation, the operator will prefer to apply a brake on the line by pressing on the thumb portion 44 in order to move the snubbing element 77 into engagement with the line to squeeze the line against the marginal edges of the grommet 72, as illustrated by the broken lines in FIG. 1 and at an optimum point, pressure on the thumb portion 44 is released to permit the line to play out.

In order to retrieve the line, the operator begins to rotate the hand crank 39 in a forward direction so that the spindle 29 and spooling member 56 are caused to rotate revolving the yoke member 64 about the bearing bushing 28. It will be noted that the end face of the bearing bushing 28 is provided with opposed recesses 54, affording camming surfaces 54a on opposite sides of said face. In each revolution, the bottom side of the yoke member 64 will register with one of the recesses 54 and the spooling member 56 will be caused to shift to the right, as viewed in FIG. 1, to the point where the side edge of the bottom of the yoke member 64 will abut against the surface of the recess 54. Continued revolution of the yoke member 64 will cause a respective camming surface 54a to urge the yoke member to move radially outwardly to the point where the bottom side of the yoke member begins to ride on the periphery of the bearing bushing 28. At this instant, the yoke member is freed from any side thrust and clearance is afforded for the spooling member 56 to move further to the right, to the point where the end face of the bearing bushing 28 abuts the inner surface of the spooling member 56, as illustrated in FIG. 1. In this position, the pick-up pin 59 is caused to be in registration with the ring 76, the ring being within the field of force of the magnet comprising the pick-up pin. Accordingly, the pick-up pin is caused to be projected radially outwardly to the solid line position illustrated in FIGS. 1 and 2 so that it may engage the line. The revolution of the pick-up pin will guide the line back upon the spool 48 in rewinding of the line.

In the modified embodiment illustrated in FIGS. 8 through 13, except for structural differences in the spooling member, the reel structure is substantially identical with that of the preferred embodiment hereinabove described and, accordingly, corresponding numerals will be employed to identify corresponding parts.

The cupped spooling member 156 is secured on the threaded end of the spindle 29 as by a nut 57. The spooling member 156 is slightly larger in diameter than the spool 48 itself and includes a smoothly rounded flange 158 which in normal position, as illustrated in FIG. 8, encompasses and projects over the flange 49 of the spool. The spooling member 156 carries a pick-up pin 159 formed of a permanent magnetic material, having a high degree of magnetism, such as "Alnico," the lower end of the pin 159 being encased in a block of material 161 preferably nylon. Recesses 162 are provided at each side, at the lower end of the block, and lugs 163 are struck from the spooling member 156 and bent inwardly to loosely engage in said recesses to permit free radial movement of the block 161 within the limits on the lengths of the recesses. The pin 159 is adapted to project through an opening in the flange 158 of the spooling member. A relatively weak compression spring 169 concentric with the pin 159 serves to urge the block and pin radially inwardly to the position illustrated in FIGS. 9 and 11. In this position, the terminal end of the pin 159 is flush with the periphery of the flange 158 of the spooling member 156, as illustrated in FIGS. 9 and 11. An arm 164 formed preferably of nylon or other suitable material is pivotally mounted on the spooling member, as at 165, against the inner surface of the forward wall of the spooling member. The arm 164 is of substantial thickness to function as a spacing means, for a purpose as will be presently described. The length of the arm 164 is such that it will engage against the spindle 29, as illustrated in FIGS. 9 and 11 but cannot pivot beyond that position. A flat spring 166 has one end anchored in the arm and is slideably held by a lug struck out from the spooling member 156. The spring 166 normally biases the arm 164 in a counterclockwise direction, as viewed in FIGS. 10 and 11 with the terminal portion of the arm tending to engage either the periphery of the spindle 29 or the periphery of the bearing bushing 28.

The cup-shaped hood 127 formed of non-magnetic material is provided with a ring of iron 176 or other suitable paramagnetic material, the ring in this instance being formed of flat wire. It will be understood, however, that ring may be formed of flat, square or round wire as desired.

The above described reel operates in the following manner. Assuming that a line retrieving operation has just been completed, the parts are disposed in the relationship illustrated in FIGS. 8 and 10, in which the spooling member 156 is in abutment with the forward face of the bearing bushing 28 and the pick-up pin 159 is in registration with the ring 176. The magnetic attraction between the pick-up pin and the ring maintains the pick-up pin in an outwardly extended position to engage the line for reeling in. It will also be noted that the terminal end of the arm 164 is in engagement with the periphery of the forward end portion 53 of the bearing bushing.

To prepare the reel for casting, the operator presses his thumb down on the portion 44 rocking the actuating member 41 in a clockwise direction, as viewed in FIG. 8. This action shifts the spindle 29 together with the spooling member 156 to the left, as viewed in FIG. 9, affording clearance for the arm 164 to rock from the position illustrated in FIGS. 8 and 10 to that illustrated in FIGS. 9 and 11. In this position, the terminal end of the arm 164 engages the spindle 29 and the arm 164 acts as a spacer to maintain the spooling member 156 in the position described. It will be observed that the pick-up pin 159 has been moved out of registration with the ring 176 and separated a sufficient distance to eliminate any magnetic attraction between the pin and the ring. Accordingly, the spring 169 now may act upon the block 161 to retract the pin to non-line-engaging position, as illustrated in FIGS. 9 and 11. In this position the line may now peel off the spool without interference.

In order to retrieve the line, the operator begins to rotate the hand crank 39 in a forward direction so that the spindle 29 and spooling member 156 are caused to rotate, revolving the arm 164 about the end portion 53 of the bearing bushing 28. In each revolution the terminal end of the arm 164 will register with one of the recesses 54 in the end face of the bearing bushing. Continued revolution of the arm 164 will cause a respective camming surface 54a to rock the arm 164 in a clockwise direction from the position illustrated in FIG. 11 to the position illustrated in FIG. 10 to the point where the terminal end of the arm 164 begins to ride on the periphery of the end portion 53 of the bearing bushing 28. At this instant the spooling member 156 is caused to move rearwardly from the position illustrated in FIG. 9 to that illustrated in FIG. 8 where the forward face of the bearing bushing is in direct abutment with the rearward surface of the spooling member. As was hereinbefore described, in this latter position the pick-up pin 159 is again brought into registration with the ring 176 and within the field of force of the magnet of the pin, thereby effecting outward movement of the pin to line pick-up position.

In the modified embodiment illustrated in FIGS. 14 through 18, inclusive, the casing is substantially similar to the two embodiments hereinabove described and, accordingly, corresponding numerals will be used to identify corresponding parts. In this embodiment, the bearing bushing 228 terminates in a flat face, the provision of recesses, as in the first two embodiments here being eliminated. The bearing bushing is suitably anchored in the vertical wall 24 of the casing and is provided in its periphery with a recess 230 in which is received a single coil spring 235 having a detent portion extending, through an aperture in the bottom of the recess, into the bore of the bearing bushing. A spindle 229 provided with an intermediate annular recess 240 is rotatably and slideably supported in the bushing bearing 228. The side wall of the recess is formed as a cam 245 for a purpose as will be hereinafter explained. The rearward extension 231 of the spindle is provided with longitudinally extending flat surfaces and carries a bevelled pinion 234 formed with an opening having a corresponding shape, so that the pinion may be caused to rotate with the spindle but is slideable axially in relation thereto. A coiled spring 236 biases the spindle to the right as viewed in FIG. 14.

A cupped spooling member 256 is carried on the forward end of the spindle 229 and is secured thereto as with a nut. The spooling member 256 carries a pick-up pin 259 formed of a permanent magnet, the lower end of the pin being encased in a block 261 of material such as nylon, the block being mounted for slideable movement in a radial direction and retained by lugs 262 struck out from the wall of the spooling member 256. A spring 269 biases the pin 259 in a direction radially inwardly of the spooling member.

A cup-shaped hood 227 is provided at its center with an open grommet 272 through which a line is adapted to pass and the flange of the hood is provided with suitable bayonet slots to engage corresponding embossings provided on the flange of the casing. The hood 227 is formed of suitable non-magnetic material, such as aluminum, and is provided with two spaced internal annular grooves and suitably fixed in said grooves are rings 275 and 276 of iron or other suitable paramagnetic material.

The above described reel operates in the following manner. Assuming that a line retrieving operation has just been completed, the parts are in the relationship illustrated in FIG. 14 in which the spooling member 256 is in fully retracted position, with the pick-up pin 259 being in vertical registration with the ring 275 whereby the pin 259 is in fully extended position for line engagement by reason of the magnetic attraction between the pin and the ring. To prepare the reel for casting, the operator presses his thumb down on the thumb portion 44 shifting the spindle 229 and with it the spooling member 256 to the left, substantially the position illustrated in FIG. 15, wherein the pin 259 is disposed intermediate the two rings 275 and 276 and out of the magnetic field of either of the rings. Accordingly, the pin 259 is caused to be moved to retracted position by the spring 269. It will be seen that as the spindle is caused to move from the position illustrated in FIG. 14 to the position illustrated in FIG. 15, the detent of spring 235 will engage the side of cam 245 at one end of the annular recess 240 and retain the spooling member 256 in such position so that the line may play out. In order to arrest the playout of the line, the operator presses down on the thumb portion 44 to move the spindle 229 and spooling member 256 farther to the left to the position illustrated in FIGS. 16 and 17, wherein the pin is caused to be in registration with the ring 276 whereby the pick-up pin 259 is caused to be projected outwardly by reason of the magnetic attraction between the pin and ring 276 and is caused to engage the line peeling off the flange of the spooling member 256.

In order to retrieve the line, the operator begins to rotate the hand crank 39 in a forward direction causing the spindle 229 to rotate whereby the cam 245 will act to cam the detent of spring 235 out of the recess 240 freeing the spindle and permitting the spring 236 to move the spindle and spooling member to the right, to the position illustrated in FIG. 14, wherein the pin 259 is again in registration with the ring 275. The magnetic attraction created between the pin and ring causes the pin to be extended outwardly to line engaging position.

It will be understood that in each of the embodiments hereinabove described, my invention also contemplates the use of an annular ring formed of a permanent magnet with the pick-up pin being formed of iron or any suitable paramagnetic material.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring of paramagnetic material within said casing arranged coaxially of said spooling member,
 (g) a magnetic pick-up pin carried on said spooling member for spooling the line and moveable in a radial direction relative to said spooling member,
 (h) said pick-up pin being arranged to be projected outwardly to line-engaging position when said spooling member is shifted axially to dispose said pick-up pin substantially in radial alignment with said ring.
2. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring element within said casing arranged coaxially of said spooling member,
 (g) a radially moveable pick-up pin element carried on said spooling member for spooling the line,
 (h) one of said elements being formed of a permanent magnet and the other of said elements being formed of a paramagnetic material,
 (i) said pick-up pin being arranged to be projected outwardly to line engaging position when said spooling member is shifted axially to dispose said pick-up pin substantially in radial alignment with said ring.
3. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring of paramagnetic material within said casing arranged coaxially of said spooling member,
 (g) a magnetic pick-up pin carried on said spooling member for spooling the line and moveable in a radial direction relative to said spooling member,
 (h) said pick-up pin being arranged to be projected outwardly to line-engaging position when said spooling member is shifted axially to dispose said pick-up pin substantially in radial alignment with said ring, and
 (i) spring means for withdrawing said pick-up pin inwardly with respect to said spooling member when said spooling member is shifted axially so that said pick-up pin is out of alignment with said ring.
4. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring of paramagnetic material within said casing arranged coaxially of said spooling member,
 (g) a magnetic pick-up pin carried on said spooling member for spooling the line and moveable in a radial direction relative to said spooling member,
 (h) said pick-up pin being arranged to be projected outwardly to line-engaging position when said spooling member is shifted axially to dispose said pick-up pin substantially in radial alignment with said ring, and
 (i) means for shifting said spooling member axially to effect alignment of said pick-up pin with said ring whereby magnetic attraction will project said pick-up pin outwardly to line engaging position.
5. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring element within said casing arranged coaxially of said spooling member,
 (g) a radially movable pick-up pin element carried on said spooling member for spooling the line,
 (h) one of said elements being formed of a permanent magnet and the other of said elements being formed of a paramagnetic material,
 (i) said pick-up pin being arranged to be projected outwardly to line engaging position when said spooling member is shifted axially to dispose said pick-up pin substantially in radial alignment with said ring,
 (j) means for shifting said spooling member axially to effect alignment of said pick-up pin with said ring whereby magnetic attraction will project said pick-up pin outwardly to line engaging position, and
 (k) spring means for withdrawing said pick-up pin inwardly with respect to said spooling member when said spooling member is shifted axially so that said pick-up pin is disposed out of alignment with said ring.

6. In a fishing reel of the character described,
 (a) casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring of paramagnetic material within said casing arranged coaxially of said spooling member,
 (g) a magnetic pick-up pin carried on said spooling member for spooling the line and movable in a radial direction relative to said spooling member,
 (h) said pick-up pin being arranged to be projected outwardly to line-engaging position when said spooling member is shifted axially to dispose said pick-up pin substantially in radial alignment with said ring,
 (i) spring means for withdrawing said pick-up pin inwardly with respect to said spooling member when said spooling member is shifted axially so that said pick-up pin is disposed out of alignment with said ring, and
 (j) means for releasably retaining said spooling member in a position whereby said pick-up pin is disposed out of alignment with said ring.

7. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring element within said casing arranged coaxially of said spooling member,
 (g) a radially movable pick-up pin element carried on said spooling member for spooling the line,
 (h) one of said elements being formed of a permanent magnet and the other of said elements being formed of a paramagnetic material,
 (i) said pick-up pin being arranged to be projected outwardly to line engaging position when said spooling member is shifted axially to dispose said pick-up pin substantially in radial alignment with said pin,
 (j) means for shifting said spooling member axially to effect alignment of said pick-up pin with said ring whereby magnetic attraction will project said pick-up pin outwardly to line engaging position, and
 (k) spring means for withdrawing said pick-up pin inwardly with respect to said spooling member when said spooling member is shifted axially so that said pick-up pin is disposed out of alignment with said ring, and
 (l) means for releasably retaining said spooling member in a position whereby said pick-up pin is disposed out of alignment with said ring.

8. In a fishing reel of the character described,
 (a) a casing,
 (b) a line spool within said casing,
 (c) the casing having a guide opening for passing the line outwardly and off the end of the spool,
 (d) a spooling member supported alongside said spool,
 (e) a handle connected to the spooling member for rotating the same,
 (f) a ring of paramagnetic material within said casing arranged coaxially of said spooling member,
 (g) a magnetic pick-up pin carried on said spooling member for spooling the line and moveable in a radial direction relative to said spooling member,
 (h) said pick-up pin being arranged to be projected outwardly to line-engaging position when said spooling member is shifted axially to dispose said pick-up pin substantially in radial alignment with said ring,
 (i) spring means for withdrawing said pick-up pin inwardly with respect to said spooling member when said spooling member is shifted axially so that said pick-up pin is disposed out of alignment with said ring,
 (j) means for releasably retaining said spooling member whereby said pick-up pin is disposed out of alignment with said ring, and
 (k) means operable upon the rotation of said handle to effect release of said releasing means whereby the spooling member is caused to move to a position wherein the pin is disposed in alignment with said ring.

9. In a fishing reel of the character described,
 (a) a casing,
 (b) a line spool within said casing,
 (c) a bearing bushing fixed in said casing,
 (d) a spindle journalled in said bushing and axially slideable relative thereto,
 (e) a handle connected to the spindle for rotating the same,
 (f) a spooling member fixed on said spindle and disposed alongside said spool,
 (g) a magnetic pick-up pin carried on said spooling member for spooling the line and moveable in a radial direction relative to said spooling member,
 (h) said pick-up pin being arranged to be projected outwardly to line engaging position when said spooling member is shifted axially to dispose said pick-up pin substantially in radial alignment with said ring,
 (i) a yoke member slideably mounted on said spooling member for radial movement and embracing the inner end portion of said pick-up pin with the pick-up pin projecting through said yoke member and being limited in its outward radial movement by the relative position of said yoke member,
 (j) first spring means biasing said yoke member in a direction radially inwardly,
 (k) second spring means biasing said spooling member in a direction to engage against an end face of said bearing bushing,
 (l) means for shifting said spooling member away from said end face to permit said yoke member to engage against the periphery of said spindle and thereby to retain said pick-up pin in retracted position,
 (m) the yoke member being retained in said last mentioned position by engagement with said end face under the pressure of said second spring means, and
 (n) means operable upon the rotation of said handle to effect release of said yoke member whereby the spooling member is caused to move to a position wherein the pick-up pin is disposed in alignment with said ring.

10. In a fishing reel of the character described,
 (a) a casing,
 (b) a spooling member supported for rotation and axial movement within said casing,
 (c) a ring element within said casing arranged coaxially of said spooling member,
 (d) a pick-up pin element for spooling the line carried on said spooling member and moveable radially relative thereto,
 (e) one of said elements being formed of a permanent magnet and the other of said elements being formed of a paramagnetic material,
 (f) and means for shifting said spooling member axially to effect alignment of said pick-up pin with said ring whereby magnetic attraction will project said pickup pin outwardly to line engaging position.

11. In a fishing reel of the character described,
 (a) a casing,
 (b) a spooling member supported for rotation and axial movement within said casing,
 (c) a pair of spaced ring elements within said casing, arranged coaxially of said spooling member, (d) said ring elements being formed of a paramagnetic material, (e) a magnetic pick-up pin carried on said spooling member for spooling the line and moveable in a radial direction relative to said spooling member, (f) means for shifting said spooling member axially to effect selective alignment of said pick-up pin with either of said rings whereby magnetic attraction will project said pick-up pin outwardly to line engaging position, (g) and means for retracting said pick-up pin when said pick-up pin is out of alignment with either of said rings.

12. The invention as defined in claim 6 in which the releasable means comprises a spring-biased pivoted arm.

References Cited in the file of this patent
UNITED STATES PATENTS

| | | |
|---|---|---|
| 2,862,679 | Denison et al. | Dec. 2, 1958 |
| 2,020,666 | Hull | Feb. 13, 1962 |
| 2,059,872 | Griffis | Oct. 23, 1962 |

UNITED STATES PATENT OFFICE

CERTIFICATE OF CORRECTION

Patent No. 3,097,813                                        July 16, 1963

Edward J. Golec

It is hereby certified that error appears in the above numbered patent requiring correction and that the said Letters Patent should read as corrected below.

Column 1, line 72, for "tank" read -- tang --; column 12, line 9, for "2,020,666" read -- 3,020,666 --; line 10, for "2,059,872" read -- 3,059,872 --.

Signed and sealed this 28th day of January 1964.

(SEAL)
Attest:
ERNEST W. SWIDER

Attesting Officer

EDWIN L. REYNOLDS

Acting Commissioner of Patents